Aug. 14, 1923.
W. J. SANDO
1,465,001
SYSTEM FOR TREATING ACTIVATED SLUDGE
Filed Feb. 5, 1923
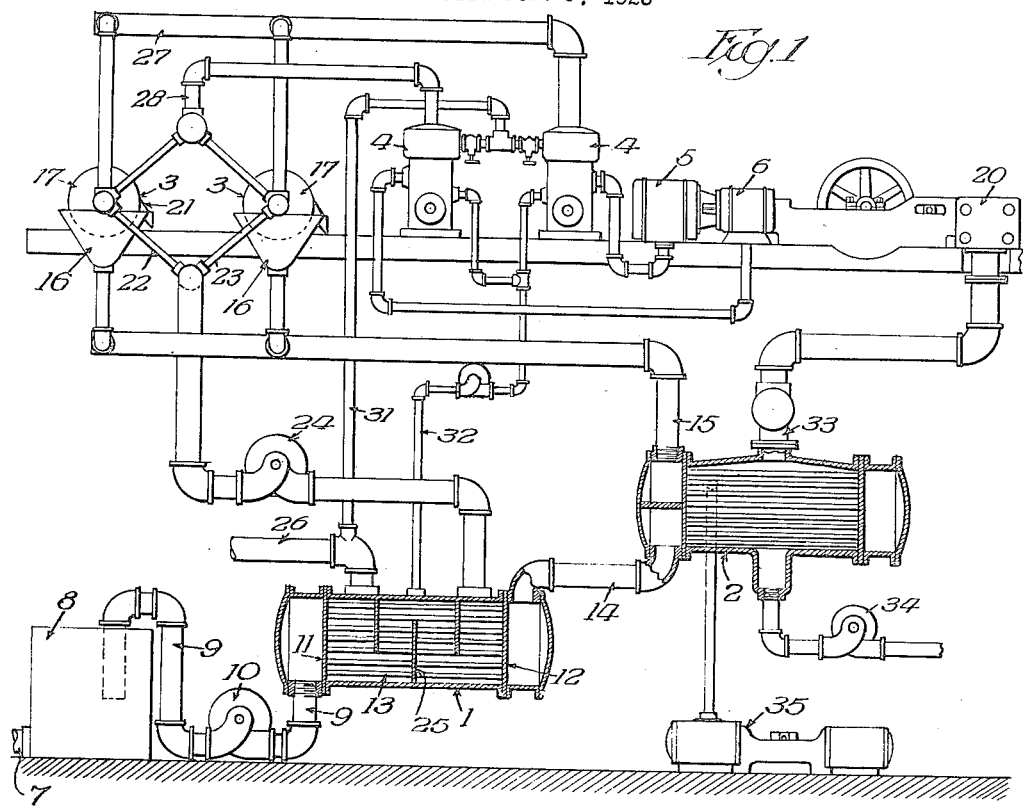
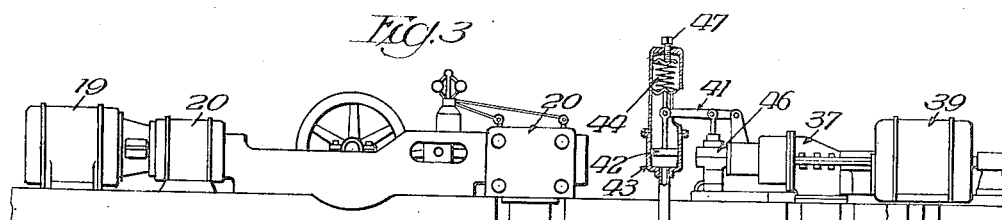
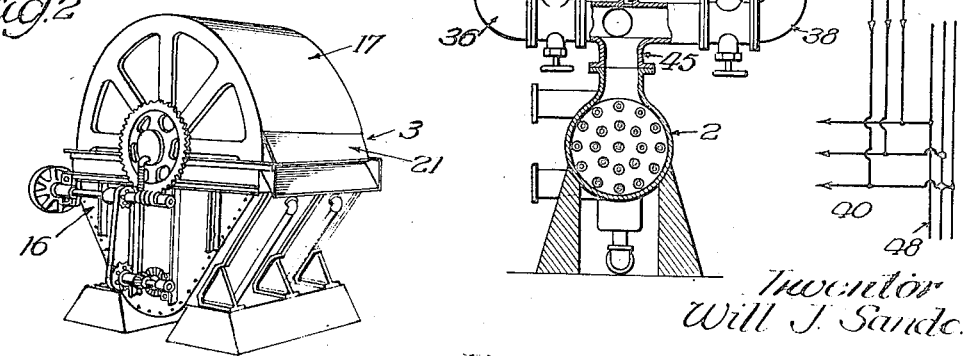
Inventor
Will J. Sando.
By Edwin B. H. Tower, Jr. Atty.

Patented Aug. 14, 1923.

1,465,001

UNITED STATES PATENT OFFICE.

WILL J. SANDO, OF MILWAUKEE, WISCONSIN.

SYSTEM FOR TREATING ACTIVATED SLUDGE.

Application filed February 5, 1923. Serial No. 617,003.

*To all whom it may concern:*

Be it known that I, WILL J. SANDO, a citizen of the United States, residing at Milwaukee, in the county of Milwaukee and State of Wisconsin, have invented new and useful Improvements in Systems for Treating Activated Sludge, of which the following is a specification.

This invention relates to a system for treating activated sludge.

The activated sludge is formed from raw sewage by passing air therethrough in suitable tanks and by the action of bacteria therein.

One of the objects of this invention is to provide means for treating sewage to render it substantially pure.

Another object is to provide means for treating sewage by which a fertilizer may be readily obtained therefrom.

Another object is to provide a system for treating activated sludge in which there will be small heat losses.

Another object is to provide a system for treating activated sludge in which the heat requirements are automatically maintained.

Another object is to provide a system for treating activated sludge in which the heat requirement is balanced by the waste heat from the power developing means.

Another object is to provide means by which the activated sludge may be treated expeditiously, economically and commercially to remove the solid particles therefrom.

Other objects and advantages will hereinafter appear.

In accordance with this invention as preferably carried out in practice, the sludge is heated to a temperature sufficient to cause coagulation of the solid matter therein and while in such heated condition, the solid matter is removed therefrom by suitable filters or presses.

The solid matter removed from the sludge may be dried and used for fertilizer, thus producing an important product of value.

The hot effluent from the filter, or press, is passed through a heat exchanger, imparting its heat to the cold sludge coming from the tanks.

The exhaust from the steam prime movers of the system is utilized to further heat the sludge to a temperature at which the solid particles may be readily removed therefrom.

A steam turbine-generator may be provided to supply power for the system and the exhaust from the turbine regulated to maintain a predetermined temperature in the heater.

Activated sludge containing as low as one per cent of solids may be successfully and commercially treated by this system and the solid matter readily separated therefrom in the form of a cake.

In order to further explain the invention and a way in which it may be embodied, the apparatus shown in the accompanying drawings will be described.

Fig. 1 is a diagrammatic view of the system.

Fig. 2 is a perspective view of a vacuum filter.

Fig. 3 is a diagrammatic view showing a manner of balancing the waste heat of the power developing means against the heat requirements of the system.

The system shown in Fig. 1 comprises a primary heater 1, a secondary heater 2, vacuum filters 3, pre-coolers 4 for the air drawn through the filter and high and low vacuum pumps 5 and 6.

The activated sludge flows through the conduit 7 into a suction well 8. It is pumped from the well 8 through the conduit 9 to the primary heater 1 by a steam driven pump 10 of centrifugal or other suitable type.

The primary heater is provided with headers 11 and 12 connected by a plurality of tubes 13 through which the sludge passes.

The sludge is heated in the primary heater as will hereinafter more fully appear and is then forced through the conduit 14 to the secondary heater 2 where its temperature is further raised sufficiently to cause coagulation thereof so that a cake may be readily formed on the filter drum.

This temperature has been found to range between 100 and 190 degrees Fahrenheit.

The sludge discharged from the secondary heater 2 passes through the conduit 15 to the filter tanks 16.

These tanks accommodate continuously rotating cylindrical filtering drums 17.

The outer surface of these drums is covered with cloth or other filtering medium.

A partial vacuum is produced within the drums 17 by the high and low vacuum pumps 5 and 6 driven by a steam prime mover 20.

Suitable valve mechanism, not shown, is provided for the drums whereby the portions thereof submerged in the sludge of the tank are supplied with high vacuum while those portions of the drums without the tank are supplied with relatively low vacuum.

The vacuum produced within the drums draws the sludge against the submerged portions thereof as they revolve in the sludge.

The liquid content of the sludge is drawn through the filtering medium into the interior of the drum.

The sludge collected on the surface of the filter is partially dried by evaporation and by the dewatering effect of the vacuum, thus forming a cake thereon.

A scraper 21 bears against the face of the drum and removes the cake therefrom as the drum revolves. The cake may be conveyed to driers where substantially all of the moisture is removed.

The hot filtrate drawn through the filtering medium passes from the interior of the drum through the outlet conduits 22 and 23 to a steam driven pump 24 by which it is forced through the primary heater 1 around the tubes 13 imparting its heat to the cold sludge coming from the well 8.

The path of the hot filtrate through the primary heater is defined by the baffle plates 25.

The filtrate is discharged from the primary heater through the conduit 26 at a temperature which is predetermined to effect the most economical balance of heat and power for the operation of the filter house.

The air passing through the filtering medium is mixed with condensable vapors and drawn by the vacuum pumps 5 and 6 through the conduits 27 and 28 to the jet pre-cooler condensers 4.

The injection water for the pre-cooler condensers is taken from the outlet 26 of the primary heater through the conduit 31 and sprayed into the condensers 4 to cool the air therein and condenses the vapors carried over therewith.

The condensed vapors, together with the injection water is pumped through the conduit 32 to the primary heater 1 where it also imparts its heat to the incoming sludge.

The filtrate or effluent discharged from the primary heater is substantially pure and may be disposed of in any suitable manner without causing a nuisance or being injurious to health.

The cake produced may be used for fertilizer.

It will be noted that a predetermined portion of the heat contained in the filtrate and in the air drawn through the drums 17 is returned to the system through the primary heater 1.

The only appreciable heat losses are, loss by radiation, evaporization, heat retained in the cake on the filter drum, and heat contained in the filtrate discharged from the primary heater.

The vacuum pumps 5 and 6 and the auxiliary prime movers exhaust through the conduit 33 into the secondary heater 2 where the heat losses of the system are replaced.

The secondary heater also acts as a condenser for the steam prime movers of the system.

A condensate pump 34 and an air pump 35 are provided for the secondary heater to control the vacuum in the steam space thereof and consequently the back pressure of the exhaust from the prime movers.

It is obvious that the amount of heat required to be added by the secondary heater 2 is not constant.

The temperature of the incoming sludge, that is, the range through which the sludge must be heated, the percentage of solids therein, the radiation losses and other factors control the amount of heat to be added to the system by this heater.

The demands on the exhaust steam to produce the proper temperature of sludge for forming the cake will therefore vary under different operating conditions.

By properly proportioning the heating surface of the secondary heater and maintaining the proper vacuum therein the amount of steam exhausted from the prime movers, its pressure and consequently its temperature will be just sufficient under normal conditions to heat the sludge to the correct temperature for filtration.

The condensate pump 34 and the air pump 35 allow the prime movers to exhaust into the greatest possible vacuum consistent with the proper heating of the sludge.

It will be noted that a system has been provided in which the waste heat from the power requirements may be regulated over a wide range of cold sludge temperatures to supply the required heat for the filtering process.

Figure 3 discloses an extremely flexible system in which the amount of exhaust steam for preheating is always just adequate to meet the requirements of the system.

The steam cylinder of the vacuum pump exhausts into the secondary heater through the conduit 36 as in Fig. 1.

A steam turbine 37 also exhausts into the secondary heater through conduit 38. A generator 39 driven by the turbine delivers power to the line 40.

In this modification it is contemplated that the auxiliary prime movers shall be electrically driven from the line 40.

The combination speed and pressure regulator 41 controls the amount of exhaust steam supplied to the secondary heater by the turbine 37 and keeps the steam pressure in the heater constant.

A piston 42 inclosed in a casing 43 is pressed upwardly against a spring 44 by the pressure of the exhaust steam in the manifold 45 and controls the steam supply to the turbine through a pilot valve 46 or other suitable turbine speed controlling mechanism.

When the pressure of the exhaust steam entering the heater decreases the piston 42 is pressed downwardly increasing the opening of the steam valve of the turbine.

This increases the input to the turbine and consequently the exhaust therefrom, bringing the pressure in the heater up to normal.

When the pressure in the heater increases above normal the steam supplied to the turbine is correspondingly reduced.

The proper amount of steam for preheating the sludge is therefore automatically maintained.

The pressure obtained in the secondary heater may be varied by adjusting the tension of the spring 44 of the regulator through an adjusting screw 47.

The turbine-generator 37—39 may be designed to supply the power demands of any portion of the sewage disposal plant depending on the normal requirements of the filtering system for exhaust-steam and the output of the turbine can be regulated to suit the demands of the preheater to maintain the raw sludge at the most efficient temperature for economical filtration.

The generator 39 is connected in shunt with the main power line 48 of the plant.

Under normal operation the amount of steam supplied to the turbine will be sufficient to develop the amount of power required to operate the apparatus for which the generator 39 is designed.

If the requirement for exhaust steam falls below normal the power output of the generator 39 will not be sufficient to operate the electrical machines for which it is designed and they will draw current from the main power line 48. If the requirement for exhaust steam increases above normal the excess power generated will be supplied to the line 48.

The combination of vacuum pump prime movers and power generating prime movers adds flexibility to the system and makes it possible to maintain maximum economy in supplying the heat and power requirements of the filtering plant over a wide range of raw sludge temperatures.

While the heat losses of the system are set forth herein as replaced entirely by the exhaust steam from the filter plant other heating means may be utilized among which may be mentioned the flue gases from the boiler plant, the waste gases from the driers or live steam taken directly from the boilers.

The main engines of the power plant may be made non-condensing and the sludge heated by the exhaust therefrom.

While this system has been described for treating activated sludge, it is to be understood that it may be used for treating other liquids, and, of course, variations and adaptations may be made in the system without departing from the invention embodied herein and defined in the claims.

The invention claimed is:

1. A system for treating activated sludge comprising heating means for the sludge, power means for the system, and means for balancing the waste heat from the power means with the heat requirements of the system.

2. A system for treating activated sludge comprising a heater for the sludge, a filter therefor, means including the heater for imparting the heat of the filtrate to the unfiltered sludge, and means for adding an amount of heat to the system sufficient to equal the heat losses thereof.

3. A system for treating activated sludge comprising a primary heater and a secondary heater through which the sludge is passed, a filter for the heated sludge, a steam driven vacuum pump for the filter, means for passing the hot filtrate through the primary heater and the exhaust from the steam cylinder of the vacuum pump through the secondary heater.

4. A system for treating activated sludge comprising a preheater for the sludge, a filter therefor, steam driven power means for the system exhausting into the preheater, and means for maintaining a predetermined temperature therein.

5. A system for treating activated sludge comprising a preheater for the sludge, a filter therefor, steam driven power means for the system exhausting into the preheater, and means for maintaining said exhaust just sufficient to meet the heat requirements of the system.

6. In a system for treating activated sludge, means for imparting the waste heat of the system to the sludge, means for filtering the heated sludge, and means for returning the heat of the filtrate to the system.

7. In a system for treating activated sludge, a preheater and a filter for the sludge, power means for the system including a steam prime mover exhausting into the preheater, means for varying the supply of steam to said prime mover to provide an exhaust therefrom just sufficient to meet the heat requirements of the system, and means for utilizing the excess power developed by said prime mover.

8. A system for treating activated sludge comprising a preheater for the sludge, a filter therefor, a steam engine driven generator supplying power for the system, said engine exhausting into the preheater, and means responsive to the conditions in the preheater for regulating the exhaust from the engine.

9. A system for treating activated sludge comprising a preheater for the sludge, a filter therefor, a steam engine driven generator for supplying power to the system, said engine exhausting into the preheater, a main power line, and means responsive to the conditions in the preheater for regulating the output of the generator, the excess power supplied by the generator being delivered to the line.

10. A system for treating activated sludge comprising a preheater for the sludge, a vacuum filter therefor, a steam driven vacuum pump for the filter exhausting into the preheater, a steam turbine driven generator supplying power for the system, said turbine exhausting into the preheater, and means for regulating the steam input to the turbine to obtain an exhaust therefrom just sufficient to meet the heat requirements of the system.

11. A system for treating activated sludge comprising a primary heater, a secondary heater and a vacuum filter for the sludge, a steam driven vacuum pump for the filter, a steam turbine driven generator supplying power to the system, the hot filtrate from the filter imparting its heat to the raw sludge in the primary heater, and the exhaust steam from the vacuum pump and from the turbine imparting its heat to the raw sludge in the secondary heater.

12. A system for treating activated sludge comprising a primary heater, a secondary heater and a vacuum filter for the sludge, a steam driven vacuum pump for the filter, a steam turbine driven generator supplying power to the system, the hot effluent from the filter imparting its heat to the raw sludge in the primary heater, and the exhaust steam from the vacuum pump and from the turbine imparting its heat to the raw sludge in the secondary heater, and means for maintaining said exhaust steam just sufficient to meet the heat requirements of the system.

13. A system for treating activated sludge, comprising a primary heater, a secondary heater and a vacuum filter for the sludge, a steam driven vacuum pump for the filter, the hot effluent from the filter imparting its heat to the raw sludge in the primary heater and the exhaust steam from the vacuum pump imparting its heat to the raw sludge in the secondary heater.

14. A system for treating activated sludge comprising a heater for the sludge, a vacuum filter therefor, and means for imparting the heat of the filtrate and of the air drawn through the surface of the filter to the unfiltered sludge.

In witness whereof, I have hereunto subscribed my name.

WILL J. SANDO.